United States Patent [19]

Kerman

[11] Patent Number: 5,580,651

[45] Date of Patent: Dec. 3, 1996

[54] ENERGY ABSORBING PANEL

[75] Inventor: Michael L. Kerman, Romeo, Mich.

[73] Assignee: Woodbridge Foam Corporation, Mississauga, Canada

[21] Appl. No.: 387,352

[22] Filed: Feb. 13, 1995

Related U.S. Application Data

[63] Continuation of Ser. No. 17,492, Feb. 12, 1993, abandoned, which is a continuation-in-part of Ser. No. 862,172, Apr. 2, 1992, Pat. No. 5,389,316, which is a continuation-in-part of Ser. No. 744,331, Aug. 13, 1991, abandoned.

[51] Int. Cl.$^6$ ............................................... B32B 9/00
[52] U.S. Cl. .................. 428/318.4; 428/286; 428/319.3; 428/319.7; 428/319.1
[58] Field of Search ........................... 428/246, 318.4, 428/319.1, 319.3, 319.7, 286

[56] References Cited

U.S. PATENT DOCUMENTS

| | | | |
|---|---|---|---|
| 3,186,969 | 6/1965 | Cox et al. | 268/51.5 |
| 3,245,924 | 4/1966 | Cox | 260/2.5 |
| 3,493,257 | 2/1970 | Fitzgerald | 293/71 |
| 3,494,607 | 2/1970 | Rusch | 267/1 |
| 3,586,649 | 6/1971 | Cobbledick | 260/2.5 AZ |
| 3,839,138 | 10/1974 | Kyle et al. | 161/159 |
| 3,860,279 | 1/1975 | Hulten | 293/72 |
| 4,101,704 | 7/1978 | Hiles | 428/218 |
| 4,116,893 | 9/1978 | Flanagan | 521/137 |
| 4,130,614 | 12/1978 | Saidla | 264/46.4 |
| 4,508,774 | 4/1985 | Grabhoefer et al. | 428/220 |
| 4,659,618 | 4/1987 | Yazaki et al. | 428/317.7 |
| 4,663,210 | 5/1987 | Schreiber et al. | 428/160 |
| 4,766,025 | 11/1988 | Sanok et al. | 428/159 |
| 4,952,447 | 8/1990 | Phillips et al. | 428/318.6 |

FOREIGN PATENT DOCUMENTS

| | | |
|---|---|---|
| 0448063A1 | 9/1991 | European Pat. Off. . |
| 0495188A1 | 7/1992 | European Pat. Off. . |
| 2545039 | 11/1984 | France . |
| 2029301 | 2/1971 | Germany . |
| 2434175A1 | 2/1975 | Germany . |
| 428511 | 2/1990 | Japan . |
| 1169446 | 11/1969 | United Kingdom . |
| WO80/01892 | 9/1980 | WIPO . |
| WO85/00755 | 2/1985 | WIPO . |
| WO89/02363 | 3/1989 | WIPO . |

*Primary Examiner*—Christopher Raimund
*Attorney, Agent, or Firm*—Nixon & Vanderhye

[57] ABSTRACT

An energy absorbing panel comprising a resilient polyurethane foam core having a density in the range of from about 1.5 to about 24 pounds per cubic foot and an indentation force deflection at 25%, when measured pursuant to ASTM 3574-$B_1$, less than about 4000 pounds and at least one energy absorbing surface comprised of a flexible reinforcing layer covering the resilient polyurethane foam core. The panel is useful in a variety of applications where energy management is required. Upon impact, the panel is capable of absorbing at about 70% of the input energy. Futher, upon compression of the panel at the energy absorbing surface to about 50% by volume of the uncompressed panel in a direction substantially normal to the reinforcing layer, the panel recovers to at least about 90% of the volume of the uncompressed panel in less than about 30 minutes. The panel is particularly advantageous for use in' vehicular applications such as door panels, instrument panel topper pads, air bag doors and the like.

17 Claims, 2 Drawing Sheets

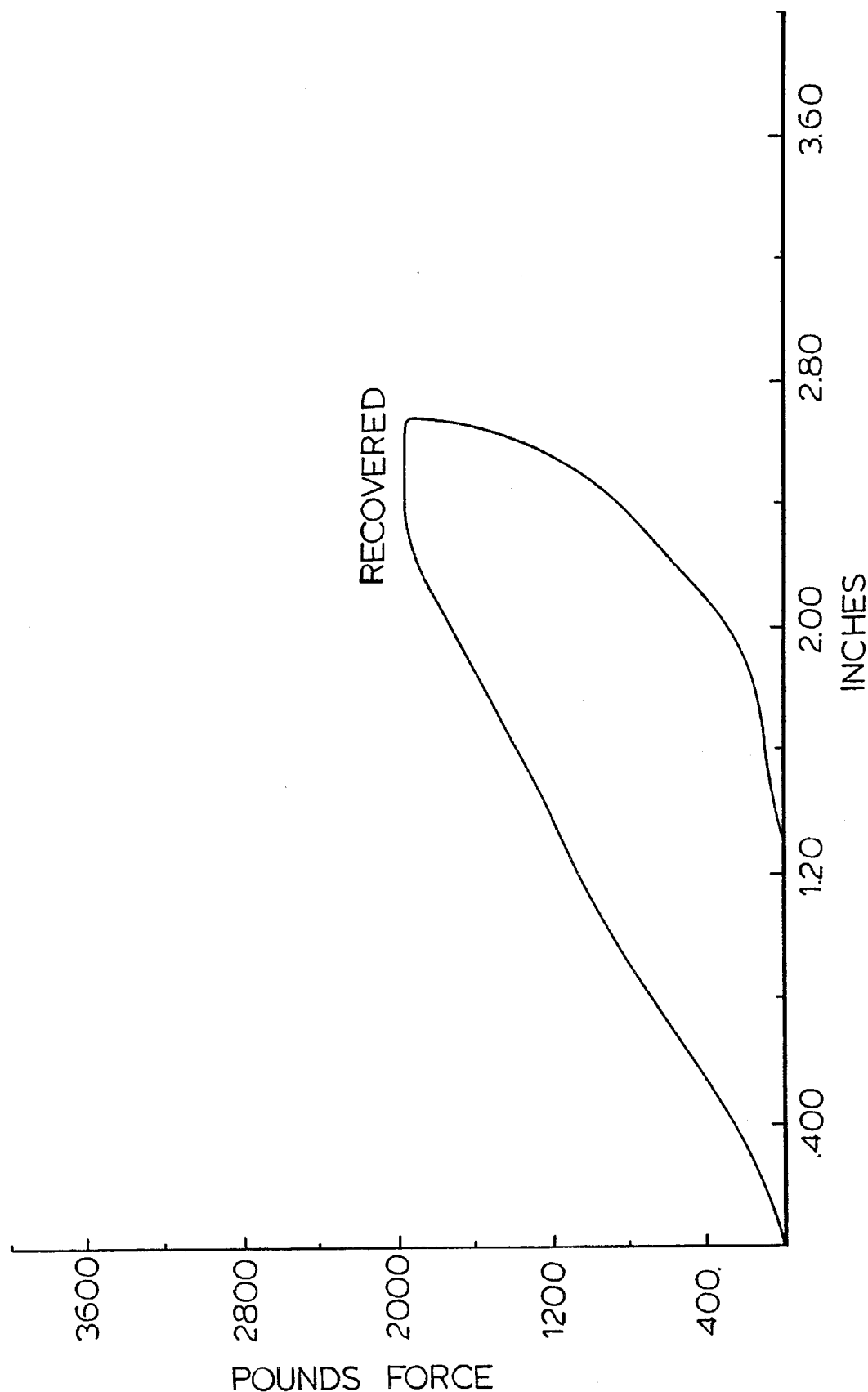

ENERGY ABSORBING PANEL

CROSS-REFERENCE TO RELATED APPLICATION

This is a Rule 62 File Wrapper Continuation of application Ser. No. 08/017,492, filed Feb. 12, 1993, now abandoned, which is a CIP of application Ser. No. 07/862,172, filed Apr. 2, 1992, now U.S. Pat. No. 5,389,316 which in turn is a CIP of application Ser. No. 07/744,331, filed Aug. 13, 1991, now abandoned.

BACKGROUND OF THE INVENTION

1. Field of the Invention

The present invention relates to an energy absorbing panel.

2. Brief Description of the Prior Art

Energy absorbing devices (also known as energy management devices) are known. Such devices can take one of a variety of shapes and forms. Currently, one of the major applications for energy absorbing panels is in vehicles, particularly automobiles. Such panels, when used in vehicles, would be of great convenience if they could be included in or substituted for trim panel and, indeed, are commonly referred to as trim panels. Current trim panels are particularly deficient as regards their ability to combine durability with energy absorbing capability.

A common use for energy absorbing panels is in a vehicle instrument panel. An instrument panel typically includes a plastic substrate and a head impact zone. Pursuant to recent governmental guidelines for improved passenger safety, it is now a prerequisite that instrument panels and areas of the interior of the vehicle have an energy management capability.

Heretofore, known instrument panels have comprised the use of a rigid substrate over which is placed a resilient, decorative foam. The foam has an indentation force deflection characteristic of about 1 to 2 pounds per square inch at 25 percent compression of the foam. This amounts to little or no energy absorbing capability for the foam. To make up for this, the substrate must be rigid, typically with a flexural modulus of at least 8,000 MPa. The rigid substrate is usually provided at a thickness of about ⅛ of an inch and is configured to have specific defined impact zones. This is deficient since the areas which are not impact zones are insufficient to absorb the energy of an impact. Rather, in such areas, the energy of impact tends to deflect away from the rigid substrate. In the case of an instrument panel, this can lead to severe or fatal consequences for a passenger in the vehicle.

The use of foam in an energy absorbing panel is known. Prior panels typically comprise the use of a friable, crushable foam (e.g. rigid polystyrene, rigid polyurethane and the like). In use, this type of foam absorbs the energy from a single impact and, concurrently, crushes. Accordingly, after a single impact, the foam must be replaced.

U.S. Pat. No. 4,508,774 discloses thermoforming compression of polyester-urethane foams. Specifically, this patent discloses cellular polyurethanes having a density of 15–400 kg/m$^3$ and based on aromatic polyisocyanates and polyester polyols. The thermoforming takes place in a forming tool at a compression factor of 1–10 and at a temperature of 140° to 200° C. This patent discloses the use of a starting polyurethane foam slab having a density of 15–40 kg/m$^3$ which is cut to suitable dimensions of the finished article. Thereafter, the cut slab is thermoformed using conventional techniques. The compression factor for closed molds is defined as the quotient of the density of the final polyurethane foam and the density of the initial polyurethane foam.

The process disclosed in U.S. Pat. No. 4,508,774 is deficient for a number of reasons. Generally, the process is complicated by having to use pre-manufactured foam. This results in extra steps associated with making and shaping the pre-manufactured foam resulting in wastage of trimmed foam. Further, the use of a pre-manufactured foam necessitates the use of a specialized mold to provide the appropriate compression factor and to withstand the conditions of rapid mold closure and specialized temperature control required in the thermoforming operation. Third, the use of a pre-manufactured foam necessitates the use of spray, laminating or hot-melt adhesives to adhere the reinforcing or decorative layer to the pre-formed foam while conducting the thermoforming operation. Fourth, when a fibrous reinforcing layer is used, the process of using an adhesive between the reinforcing layer and the polyurethane foam results in an inferior panel since the adhesive must serve the dual purpose of (i) adhering the reinforcing layer to the foam and (ii) forming a uniform matrix for inherent reinforcement of the fibrous reinforcing layer. Fifth, the requirement for a relatively high temperature during the thermoforming operation renders the overall process energy intensive.

In view of the above-mentioned deficiencies of the prior art, it would be desirable to have a relatively simple process for producing an energy absorbing panel which obviates or mitigates at least one of the above-identified deficiencies of the prior art. Ideally, this process could be used to produce an energy absorbing panel having improved properties when compared to known energy absorbing panels.

SUMMARY OF THE INVENTION

It is an object of the present invention to provide a novel energy absorbing panel.

Related U.S. Pat. No. 5,389,316 describes a process for producing an energy absorbing panel having at least one energy absorbing surface in a mold comprising an upper mold and a lower mold, the process comprising the steps of:

(i) placing a reinforcing layer in at least one of the upper mold and the lower mold;

(ii) dispensing a liquid foamable polyurethane composition in the lower mold;

(iii) closing the upper mold and the lower mold to define an enclosure corresponding to the shape of the energy absorbing panel; and (iv) expanding the foamable liquid polyurethane composition to fill substantially the enclosure to produce a resilient polyurethane foam core which adheres to the reinforcing layer thereby providing an energy absorbing surface;

wherein the reinforcing layer has a tensile strength greater than the tensile strength of the resilient polyurethane foam core and upon compression of the panel at the energy absorbing surface to about 50% by volume of the uncompressed panel in a direction substantially normal to the reinforcing layer, the panel recovers to at least about 90% of volume of the uncompressed panel in less than about 30 minutes.

It has been discovered that the panel produced in accordance with this process possesses improved properties when compared to known energy absorbing panels. More particularly, it has been discovered that the present energy absorbing panel possesses superior properties when compared to the physical properties of the panel produced in accordance with the teachings of U.S. Pat. No. 4,508,774 [Grabhoefer et at. (Grabhoefer)].

In accordance with the aspect of the present invention which forms the subject of the present application, there is provided an energy absorbing panel comprising a resilient polyurethane foam core having a density in the range of from about 1.5 to about 24 pounds per cubic foot (pcf) and an indentation force deflection at 25%, when measured pursuant to ASTM 3574-$B_1$, less than about 4000 pounds and at least one energy absorbing surface comprised of a flexible reinforcing layer covering the resilient polyurethane foam core, the flexible reinforcing layer having a tensile strength greater than the tensile strength of the resilient polyurethane foam core. Upon impact, the panel is capable of absorbing at about 70% of the input energy. Futher, upon compressor of the panel at the energy absorbing surface to about 50% by volume of the uncompressed panel in a direction substantially normal to the reinforcing layer, the panel recovers to at least about 90% of the volume of the uncompressed panel in less than about 30 minutes.

It has been discovered that the combination of foam density, foam IFD, the provision of a reinforcing layer, a resilent foam core and the energy absorbing capability and recoverability of the panel renders the present panel particularly useful in applications which require energy management capabilities. To the Applicant's knowledge, this combination of useful properties in a panel together with the ability of the panel to withstand repeated impacts is unique. One of the important advantages accruing from the invention is the provision of a durable energy absorbing panel capable of withstanding repeated impact substantially without failure.

BRIEF DESCRIPTION OF THE DRAWINGS

Embodiments of the invention will be described with reference to the accompanying drawings, in which:

FIGS. 1–2 are graphical illustrations of results of impact testing of various reinforced panels.

DETAILED DESCRIPTION OF THE PREFERRED EMBODIMENTS

Figure 1:
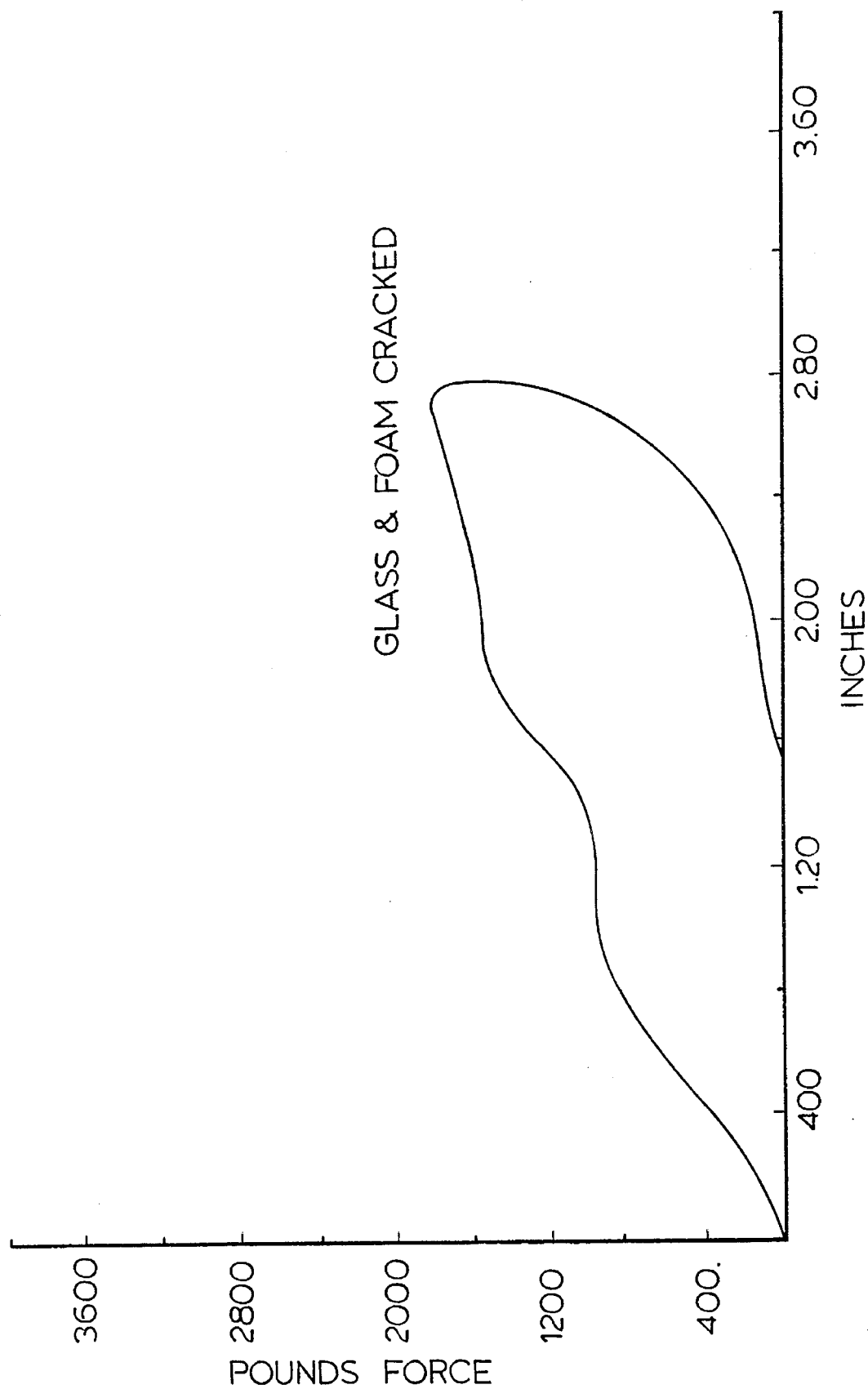

The process used to produce the present energy absorbing panel is ideally the one disclosed in related U.S. Pat. No. 5,389,316. Accordingly, it will be appreciated by those skilled in the art that the order of the process steps may be varied depending on the exact nature of the process. For example, in certain cases, it may be possible to place the reinforcing layer in the lower mold (or in the upper mold if secured by suitable fastening means), close the upper mold and the lower mold and thereafter inject the liquid foamable polyurethane composition—this is called a "closed mold" pouring technique. Alternatively, the upper mold and lower mold are not closed until the liquid polymeric composition has expanded to about 50, preferably from about 50 to about 90, more preferably from about 60 to about 80, most preferably from about 70 to about 80, percent by volume of the enclosure defined by closing the upper mold and the lower mold—this is called an "open mold" pouring technique. To the Applicants knowledge, the "open mold" and "closed mold" pouring techniques work equally well and the choice of technique used is usually dictated by the nature of the article being produced. Generally, it has been found that the "open mold" pouring technique is most convenient since the mold has to be opened in any event to place therein the reinforcing layer which is preferably flexible.

It has been surprisingly and unexpectedly discovered that the provision of the present energy absorbing panel obviates the need for a rigid substrate in particular automotive applications such as passenger side air bag doors, knee bolsters, side impact bolsters, A, B and C pillars, sun visor cores and door panels. Many of these devices have heretofore had little or no energy management capability. The necessity of such capability has been recently mandated in the United States and other countries. It has also been discovered that the present energy absorbing panel is capable of being subjected to repeated impact since the core is comprised of a relatively resilient polyurethane foam core. These outstanding properties accrue from the energy absorbing panel due to its inherent relatively uniform energy absorbing capability when compared with known panels comprising high resiliency-low energy absorbing foams and low resiliency-high energy absorbing substrates. It is believed that the relatively uniform energy absorbing capability of the present energy absorbing panel is due substantially to the interaction, upon impact, between the relatively resilient polyurethane foam core and the reinforcing layer.

The present energy absorbing panel includes at least one energy absorbing surface having a reinforcing layer adhered to and covering at least a portion of the resilient polyurethane foam core. Preferably, the polyurethane core is disposed between a first energy absorbing surface and a second energy absorbing surface in a spaced, substantially parallel relationship to one another. The provision of two energy absorbing surfaces can lead to a dramatic increase in energy absorbing capability when compared to the use of a single energy absorbing surface as will be described hereinafter.

The choice of reinforcing layer used in the present energy absorbing panel is not particularly restricted provided that it has a greater tensile strength than the polyurethane foam core and may be a non-metal or a metal. Preferably, the reinforcing layer is flexible. The flexible reinforcing layer may be fibrous or non-fibrous. Non-limiting examples of fibrous reinforcing layers include at least one member selected from the group consisting essentially of glass fibres (e.g. in the form of a cloth or a mat, chopped or unchopped, such as Nico 754 1 oz/$ft^2$), polyester fibres, polyolefin fibres (e.g. polyethylene and polypropylene), "aramid fibers (e.g. "KEVLAR", a trademark of DuPont)" fibres, polyamides fibres (e.g. nylon), cellulose fibres (e.g. burlap), carbon fibres, cloth materials such spun bound polyesters (e.g. Lutravil 1DH7210B/LDVT222 and Freudenberg PTLD585G/PTLD600B) and paper (e.g. Kraft #60). It will be appreciated that the fibrous reinforcing layer may be woven or non-woven. Non-limiting examples of a non-fibrous reinforcing layer comprise at least one member selected from the group consisting essentially of thermosets (e.g. polyurethanes, polyesters and epoxies), metals such as aluminum foil, polycarbonates (e.g. Lexan and Dow Calibre), polycarbonate/ABS alloys (e.g. Dow Pulse), ABS terpolymers (e.g. Royalite 59 and Dow Magnum), polyester terphthalate (PET), vinyl, styrene maleic anhydride (e.g. Arco Dylark), and fibreglass reinforced polypropylene (e.g. Azdel). It will be appreciated that many non-fibrous reinforcing layer materials may themselves be reinforced with fibrous materials and thus, the flexible reinforcing layer may be a combination of fibrous and non-fibrous materials, either mixed or composite in construction.

Preferably, the present energy absorbing panel further comprises a decorative layer to cover at least one surface of the energy absorbing surfaces. The specific choice of decorative layer is not particularly restricted and is usually dictated by application of the energy absorbing panel. A preferred decorative layer comprises a polyethylene or polyvinyl chloride (PVC) foam layer which is thermoformable, closed cell and, when utilized in the preferred process for producing the present energy absorbing panel, permits one-step production of the entire decorative appearing, energy absorbing panel. In the case where the energy absorbing panel comprises a single flexible reinforcing layer, the preferred process for production of the panel comprises placing the decorative layer between the mold (upper or lower) and the flexible reinforcing layer, or the decorative layer in the other of the upper mold or lower which is not used to hold the flexible reinforcing layer. In the case where two flexible reinforcing layers are used, the decorative layer may placed between the flexible reinforcing layer and either of the upper mold and lower mold, preferably the upper mold. When a decorative layer is disposed between the flexible reinforcing layer and one the molds, it is preferred to use a flexible reinforcing layer which is at least somewhat permeable to the expanding foam mass in the mold. This allows for the expanding foam mass to pass through the flexible reinforcing layer thereby providing a resilient polyurethane foam core which is adhered to both the flexible reinforcing layer and the decorative cover.

After expansion of the liquid foamable polyurethane composition, the polyurethane foam core produced therefrom preferably has a specific gravity of less than about 0.40, more preferably in the range of from about 0.10 to about 0.25. Preferably, the liquid foamable polyurethane composition has a free rise density of from about one to about twenty pounds per cubic foot, more preferably from about two to about eight pounds per cubic foot. For most mold foams, this would give use to a foam core having a density in the rang of from about 1.5 to about 24 pcf. more preferable from about 2.5 to about 12 pcf. In a preferred aspect of the present energy absorbing panel, the polyurethane foam core has an indentation force deflection at 25% deflection in the range of from about 150 to about 4,000 pounds, more preferably from about 500 to about 2500 pounds, most preferably from about 900 to about 2000 pounds, when measured pursuant to ASTM 3574-$B_1$.

Upon compression of the present energy absorbing panel at the energy absorbing surface to about 50%, preferably to about 65%, more preferably to about 80%, by volume of the uncompressed panel in a direction substantially normal to the flexible reinforcing layer, the panel recovers to at least 90%, preferably at least 95%, by volume of the uncompressed panel in less than about 30 minutes. Preferably, the panel recovers to at least about 90% by volume of the uncompressed panel in less than about 10 minutes, more preferably less than about two minutes.

A particularly preferred embodiment of the present energy absorbing panel comprises the provision of two flexible reinforcing layers. Ideally, in this embodiment, the preferred process, as described in related U.S. Pat. No. 5,389,316, comprises placing a flexible reinforcing layer in each of the upper mold and the lower mold. Thereafter, the liquid foamable polyurethane composition may be conveniently dispensed, via an "open pour" or a "closed pour" technique, directly on to the flexible reinforcing layer previously placed in the lower mold. After the liquid foamable polyurethane composition is expanded to provide the resilient polyurethane foam core adhered to each of the flexible reinforcing layers, the preferred energy absorbing panel of the invention results and comprises two energy absorbing surfaces (i.e. at each flexible reinforcing layer) disposed in a spaced, substantially parallel relationship with respect to one another. The energy absorbing ability of such a panel is dramatically increased when compared to an energy absorbing panel comprising a single energy absorbing surface (i.e. a single flexible reinforcing layer).

The choice of liquid foamable polyurethane composition suitable for use in the present energy absorbing panel is not particularly restricted. Non-limiting and preferred examples of suitable polyurethane foams for use in the present panel are available from Woodbridge Foam Corporation under the tradename Enerflex.

Generally, the polyurethane foam suitable for use in the present panel and having the requisite characteristics may be produced from the following general; non-limiting formulation:

| Component | Amount |
|---|---|
| Polymer Polyol | 100–0 parts |
| Polyol | 0–100 parts |
| Crosslinker | 0–30 parts/100 parts total polyol |
| Catalyst | 0.05 to 3.5 parts/100 parts total polyol |
| Silicone Surfactants | 0–1.5 parts/100 parts total polyol |
| $H_2O$ | 0.5 to 3.5 parts/100 parts total polyol |
| Isocyanate | Adequate quantity for an index of from about .60 to 1.30 ratio of NCO equivalents to the equivalents of NCO reactive sights. |

Suitable polymer polyols, polyols and isocyanates are described in U.S. Pat. Nos. 3,304,273, 3,383,351, 3,523,093, 3,939,106 and 4,134,610, Belgian patent 788,115, Canadian Patent 785,835 and "Polymer/Polyols, a New Class of Polyurethane Intermediate", Kuryla, W. C. et al., J. Cellular Plastics, March (1966), the contents of which are hereby incorporated by reference.

Suitable crosslinkers, catalysts and silicone surfactants are described in U.S. Pat. Nos. 4,107,106 and 4,190,712, the contents of which are hereby incorporated herein by reference.

The preferred polyurethane foam suitable for use in the present panel may be produced from the following formulation:

| Component | Amount |
|---|---|
| Polymer Polyol[1] | 20–100 parts |
| Polyol[2] | 0–80 parts |
| Crosslinker[3] | 5–15 parts/100 parts total polyol |
| Catalyst[4] | 0.5–1.2 parts/100 parts total polyol |
| Silicone Surfactants[5] | 0.3–1.1 parts/100 parts total polyol |
| $H_2O$ | 1.75–2.75 parts/100 parts total polyol |
| Isocyanate[6] | Adequate quantity for an index of from about 0.8 to 1.1 ratio of NCO equivalents to the equivalents of NCO reactive sites. |

[1] AC West Virginia Polyol Co. NIAX 31-28
[2] 5000 MW propylene oxide adduct of glycerine with 75% primary capping
[3] BASF 953
[4] DABCO R-8020
[5] Goldschmidt B-4113
[6] Dow Chemical Company PAPI 901

It should be noted that the flexible reinforcing layer used in the energy absorbing surface is used on or just beneath (due to impregnation by the expanding foam) the surface of the panel only. In other words, the components of the reinforcing layer are not used as fillers throughout the polyurethane foam core. Using this reinforcement technique on this particular type of resilient polyurethane foam provides surprising and unexpected stiffness and energy absorbing capabilities for the panel.

The present energy absorbing panel is advantageous over the prior art in that it is relatively efficient to produce and has properties superior to known energy absorbing panels.

The energy absorbing panel produced according to the present invention is useful in a variety of applications. The energy absorbing panel has particular vehicular applications such as in door panels, visors, instrument panel topper pads, air bag doors, pillar covers and the like.

The present panel can also be used is applications where unenforced foam are used.

Further, the energy absorbing panel produced according to the present invention can be used in heel blocker pads. As will be appreciated by those skilled in the art, heel blocker pads are located under the carpet and dash insulator in a vehicle against the sheet metal of the dash. These devices serve to protect the bones of the drivers leg from excess loading under the heel of the drivers foot during a front end crash.

The energy absorbing panel produced according to the present invention may also be used in knee bolsters used in vehicles. Typically, knee bolsters are used as blockers to prevent the knees of the driver and passenger in the front seat of a vehicle from sliding forward and underneath the instrument panel structure during an impact.

The energy absorbing panel produced according to the present invention may be used as an anti-submarining device in vehicle seats. Generally such devices are incorporated underneath the seat cushion and serve the purpose of preventing the occupant from sliding forward and under the seat restraint during impact.

Embodiments of the present invention will now be illustrated with reference to following Examples, which should not be construed to limit the scope of the invention. In the Examples, unless otherwise indicated, all parts are parts by weight.

EXAMPLE 1

In the Example, the following materials were used:

Polyester Polyol 1—Commercially available under the tradename RUCO F-207, this polyester polyol has a functionality of 2.45 and hydroxyl number of 58.5, and is prepared by the condensation polymerization of adipic acid with diethylene glycol (DE6) and trimethylolpropane (TMP).

Polyester Polyol 2—Available under the tradename RUCO XF-5472215, this polyester polyol has a functionality of 3.0 and a hydroxyl number of 227.1, and is prepared by the condensation polymerization of adipic acid, phthalic acid anhydride, 1,3-propylene glycol and TMP.

Polyester Polyol 3—Available from Inolex Chemical under the tradename D-382134-XIN, this polyester polyol has a functionality of 3.8 and a hydroxyl number 345, and is prepared by the condensation polymerization of adipic acid, phthalic acid anhydfide, oleic acid and TMP.

Polyether Polyol 1—Commercially available under the tradename DOW XAS 10921.00L, this trifunctional polyether polyol has a hydroxyl number of 35 and is prepared by oxyalkylating glycerine with 1,2-propylene oxide and ethylene oxide in an 85: 15 weight ratio.

Triisopropanolamine—Commercially available under the tradename DOW Triisopropanolamine 99.

N,N-Dimethylbenzylamine—Commercially available under the tradename Zeeland Chemical Sumine 2015.

Polymeric MDI—Commercially available under the tradename BASF M20S, this is a mixture comprising approximately 50 parts by weight diphenylmethane diisocyanate and 50 parts by weight polyphenyl-polymethylene polyisocyanate, and has an NCO content of 31.8% by weight.

As will be appreciated by those of skill in the art, polyester polyols 1, 2 and 3 above are similar or identical to Grabhoefer's polyester polyols I, II and III, respectively. Similarly, polyether polyol 1 and the polymeric MDI above are similar or identical to Grabhoefer's polyether polyol I and polymeric MDI, respectively.

Essentially, Example 1 of Grabhoefer was repeated and thus, this Example is for comparative purposes only and is outside the scope of the present invention. Specifically, the formulation in Table 1 was blended for ten (10) seconds under agitation provided by a mixer operating at 3,000 rpm and allowed to rise/expand freely in a suitable reaction vessel. The formulation in Table 1 has a similar hydroxyl number and functionality as the formulation disclosed in Grabhoefer Example 1.

The foam produced from the formulation in Table 1 had a core density of 1.84 lb/ft$^3$.

TABLE 1

| Ingredient | Amount (parts) |
| --- | --- |
| Polyester Polyol 1 | 40.0 |
| Polyester Polyol 2 | 20.0 |
| Polyester Polyol 3 | 10.0 |
| Polyether Polyol 1 | 30.0 |
| Surfactant[1] | 1.5 |
| Water | 4.0 |
| Triisopropanolamine | 3.2 |
| N,N-Dimethylbenzylamine | 1.7 |
| Polymeric MDI | 97.8 |

[1]Commercially available from Air Products under the tradename DC 197. It was necessary to use a surfactant to produce a stable foam (this was not disclosed in Grabhoefer).

To produce the thermoformed samples for impact testing, a block having dimensions 12"×8"×8" was compressed in one dimension in a suitable mold and heated for two hours at 380° F. The heat-treated, compressed sample was removed from the mold and trimmed, and had dimensions 7½"×7½"×4". The indentation force deflection of the foam at 25% deflection, as determined pursuant to ASTM 3574-B$_1$, was found to be 485.2 pounds. In this Example, ASTM 3574-B$_1$ was modified by (i) using a heat-treated, compressed sample having dimensions 7½"×7½"×4" instead of the dimensions 15"×15"×¾", and (ii) omitting the prescribed 65% preflex step (the foam was much too rigid for preflex).

The top and bottom surfaces of the heated-treated, compressed samples (i.e. those surfaces having dimension 7½"× 7½") were saturated with a polyurethane adhesive. The reinforcing layer utilized was ¾ ounce NICO fiberglass mat which was similarly saturate with a polyurethane adhesive. The polyurethane adhesive used was a 1:1 mixture BASF TF 2104 Resin and BASF TF 2100 Isocyanate and had a gel time of five minutes. Adhesion was achieved simply by pressing the fiberglass mat to the surfaces of the foam until the adhesive had cured.

The reinforced sample was then subject to impact testing. Specifically, the sample was mounted in a Defiance EEl Model 4400 Impact Tester (equivalent mass: 15.6 pounds) and thereafter impacted with a five inch diameter hemisphere (also known as a kneeform) at an impact velocity of 24 mph. The load (pounds-force) and penetration (inches on a four inch scale) of the hemi-sphere during impact were recorded and the results are illustrated graphically in FIG. 1. The actual impact velocity was 23.9 mph and the rebound velocity was 7.9 mph.

Initial impact testing resulted in shattering and thus, complete failure of the sample. Accordingly, impact testing was repeated on a sample whose sides were constrained by an open wood box. During this constrained impact testing, the reinforcing layer/glue combination cracked thereby providing a failed region extending more than half way into the foam. This is undesirable since it is akin to the known single use energy absorbing panels.

EXAMPLE 2

In this Example, an energy absorbing foam panel in accordance with the present invention was produced. Specifically, a mold was provided comprising an upper mold and a lower mold. Each of the upper and lower molds were lined with the reinforcing layer described in Example 1 above. Thereafter, the formulation provided in Table 2 was dispensed in lower mold. As the formulation expanded the molds were closed and maintained in this state until expansion and curing of the foam was complete.

TABLE 2

| Ingredient | Amount (parts) |
| --- | --- |
| Polyol[1] | 100.0 |
| Water | 2.5 |
| Ethylene Glycol | 5.8 |
| Catalyst[2] | 0.6 |
| Catalyst[3] | 0.1 |
| Polymeric MDI[4] | 75.6 |

[1]Commercially available from ARCO under the tradename NIAX 34-28
[2]Commercially available from Air Products under the tradename DABCO 33LV
[3]Commercially available from Air Products under the tradename DABCO BL-11
[4]Commercially available from ICI under the tradename RUBIFLEX 21A The indentation force deflection of the foam at 25% deflection, as determined pursuant to ASTM 3574-$B_1$ (modified as described in Example 1 above), was found to be 971.1 pounds.

After expansion and curing was complete, an energy absorbing panel having dimensions 16"×16"×4" was produced. This panel was removed from the mold and trimmed to provide a test panel having dimensions 7½"×7½"×4" (the 7½"×7½" surfaces were reinforced).

The reinforced panel was then subject to impact testing using the methodology of Example 1 above. The load and penetration during impact were measured and the results are illustrated graphically in FIG. 2. The impact velocity was 23.6 mph and the rebound velocity was 10.4 mph. This translate into 80.5% of the input energy being absorbed by the panel. Further, the test panel recovered to more than 95% of its orginal volume in less than 2 minutes.

As is evident from FIG. 2, the panel is capable of bearing a load of less than 2000 and a penetration of less than 3 inches. This translates into superior energy management capabilities. In contrast, this combination of properties could not be achieved in producing the Grabhoefer foam, which failed to some degree upon constrained impact.

It is noteworthy that, in comparing the impact test results for the present panel and the Grabhoefer panel, the former withstood impact without the need for constraining its sides.

In contrast, impact test results could only be obtained on a constrained Grabhoefer panel.

I claim:

1. A resilient vehicular interior energy absorbing panel selected from the group consisting of door trim panels, visors, instrument panels, topper pads, air bag doors, pillar covers, knee bolsters and anti-submarining devices, the panel comprising:

a resilient polyurethane foam core having a density in the range of from about 1.5 to about 24 pounds per cubic foot and an indentation force deflection at 25%, when measured pursuant to ASTM 3574-$B_1$, less than about 4000 pounds; and at least one energy absorbing surface comprised of a flexible reinforcing layer covering the resilient polyurethane foam core, the flexible reinforcing layer having a tensile strength greater than the tensile strength of the resilient polyurethane foam core, the energy absorbing panel resisting cracking upon being impacted on the energy absorbing surface at about 24 mph with a five inch diameter hemi-sphere having a mass of 15.6 pounds, said polyurethane foam core being formed from a foamable polyurethane composition comprising 20–100 parts polymer polyol, 0–80 parts polyol, 5–15 parts crosslinker per 100 parts total polyol, 0.5 to 1.2 parts catalyst per 100 parts total polyol, 1.75 to 2.75 parts water per 100 parts total polyol and isocyanate in an amount sufficient to provide an index of from about 0.8 to about 1.1 ratio of NCO equivalents to equivalents of NCO reactive sites, the flexible reinforcing layer being permeable to said foamable polyurethane composition;

said panel, upon compression at an energy absorbing surface to about 50% by volume of the uncompressed panel in a direction substantially normal to the reinforcing layer, recovering to at least about 90% by volume of the uncompressed panel in less than about 30 minutes.

2. The energy absorbing panel defined in claim 1, wherein said energy absorbing surface is comprised of a flexible fibrous reinforcing layer.

3. The energy absorbing panel defined in claim 2, wherein said fibrous reinforcing layer comprises at least one member selected from the group consisting of glass fibres, polyester fibres, polyolefin fibres, aramid fibres, polyamide fibres, cellulose fibres and carbon fibres.

4. The energy absorbing panel defined in claim 1, wherein said energy absorbing layer is comprised of a non-fibrous reinforcing layer.

5. The energy absorbing panel defined in claim 4, wherein said non-fibrous reinforcing layer comprises at least one member selected from the group consisting of thermosets, aluminum foil, polycarbonates, polycarbonate/ABS alloys, ABS terpolymers, polyester terphthalate (PET), vinyl, styrene maleic anhydride, and fibreglass reinforced polypropylene.

6. The energy absorbing panel defined in claim 1, further comprising a decorative layer.

7. The energy absorbing panel defined in claim 2, comprising two reinforcing layers in a spaced relationship.

8. The energy absorbing panel defined in claim 1, comprising two reinforcing layers in a spaced relationship.

9. The energy absorbing panel defined in claim 6, comprising two reinforcing layers in a spaced relationship.

10. The energy absorbing panel defined in claim 7, wherein the reinforcing layer is fibrous.

11. The energy absorbing panel defined in claim 10, wherein the reinforcing layer comprises at least one member selected from the group consisting of glass fibres, polyester fibres, polyolefin fibres, aramid fibres, polyamide fibres, cellulose fibres and carbon fibres.

12. The energy absorbing panel defined in claim 7, wherein the reinforcing layer is non-fibrous.

13. The energy absorbing panel defined in claim 12, wherein said non-fibrous reinforcing layer comprises at least one member selected from the group consisting of thermosets, aluminum foil, polycarbonates, polycarbonate/ABS alloys, ABS terpolymers, polyester terphthalate (PET), vinyl, styrene maleic anhydride, polyvinyl chloride and fibreglass reinforced polypropylene.

14. The energy absorbing panel defined in claim 1, wherein said polyurethane foam core has a free rise density of from about 2.5 to about 12 pounds per cubic foot.

15. The energy absorbing panel defined in claim 1, wherein the resilient polyurethane core has an indentation force deflection at 25%, when measured pursuant to ASTM 3574-$B_1$, in the range of from about 500 to about 2500 pounds.

16. The energy absorbing panel defined in claim 1, wherein the resilient polyurethane core has an indentation force deflection at 25%, when measured pursuant to ASTM 3574-$B_1$, in the range of from about 900 to about 2000 pounds.

17. The energy absorbing panel defined in claim 4, wherein said non-fibrous reinforcing layer comprises polyvinylchloride.

* * * * *